(12) United States Patent  (10) Patent No.: US 6,176,672 B1
Egan et al.  (45) Date of Patent: Jan. 23, 2001

(54) TELESCOPING PERSONAL MOTORCYCLE SUPPORT STRUCTURE

(76) Inventors: Gordon Egan, P.O. Box 2830, Idaho Falls, ID (US) 83403-2830; Marshall Egan, 6072 S. 46 East, Idaho Falls, ID (US) 83406

(*) Notice: Under 35 U.S.C. 154(b), the term of this patent shall be extended for 0 days.

(21) Appl. No.: 09/363,656

(22) Filed: Jul. 30, 1999

Related U.S. Application Data

(60) Provisional application No. 60/094,967, filed on Jul. 31, 1998.

(51) Int. Cl.[7] .................................................. B60P 1/43
(52) U.S. Cl. ......................... 414/462; 414/477; 414/538
(58) Field of Search .................................. 414/462, 469, 414/477, 480, 538; 280/414.1

(56) References Cited

U.S. PATENT DOCUMENTS

| | | | |
|---|---|---|---|
| 4,655,671 | * | 4/1987 | Pratt ...................................... 414/477 |
| 5,556,249 | * | 9/1996 | Heine ................................ 414/538 X |
| 5,603,600 | * | 2/1997 | Egan et al. ........................... 414/462 |
| 5,730,577 | * | 3/1998 | Jones ..................................... 414/462 |
| 5,846,047 | * | 12/1998 | Riekki .............................. 414/462 X |

* cited by examiner

Primary Examiner—Janice L. Krizek
(74) Attorney, Agent, or Firm—Aquilino, Welsh & Flaxman

(57) ABSTRACT

An apparatus for loading and unloading a motorcycle into the bed of a conventional pick-up truck which only requires a single operator. The device includes a support frame mountable to the bed of a pick-up truck which supports at least one telescoping, pivotal ramp assembly. The ramp assembly includes first and second ramp members which are telescoped together so as to extend and form an elongated ramp. The first ramp section is pivotally secured at its rear end to the rear end of the support frame by a hinge. The hinge allows the first and second ramp members to pivot together and also functions to guide the second ramp member as it slides along a channel in the length of the first ramp member. A sled is coupled to the second ramp member for support the motorcycle loaded on the apparatus. In operation the motorcycle is secured to the sled and pulled up the second ramp member. The second ramp member then travels along the first ramp member while the weight of the motorcycle causes the ramp assembly to pivot downward until it lies in a horizontal plane.

19 Claims, 5 Drawing Sheets

TELESCOPING PERSONAL MOTORCYCLE SUPPORT STRUCTURE

This Appln claims the benefit of Provisional No. 60/094,967 filed Jul. 31, 1998.

BACKGROUND OF THE INVENTION

1. Field of the Invention

The present invention relates to a telescoping, pivotal frame structure for loading, unloading and transporting a motorcycle in the bed of a pick-up truck, or onto a variety of transporting means.

2. Description of the Prior Art

It is often desirable, and sometimes necessary, for motorcycle owners to transport their motorcycles from location to location. This is often accomplished by securing the motorcycle within the bed of a pick-up truck and driving the motorcycle to a desired location.

However, motorcycles are very heavy and it's often difficult to load and unload a motorcycle from the bed of a pick-up truck. As such, a need exists for a device facilitating the convenient, reliable and secure transport of a motorcycle within the bed of a conventional pick-up truck. The present invention provides such a device.

SUMMARY OF THE INVENTION

It is, therefore, an object of the present invention to provide a device for loading and unloading an object. The device includes a support frame having a front end and a rear end. The device further includes a ramp having a first ramp member with a rear end pivotally attached to the support frame and extending forward toward the front end of the support frame. The device also includes a second ramp member telescopically secured to the first ramp member permitting the second ramp member to travel the length of the first ramp member and to pivot therewith. A sled is mounted to the second ramp member for free movement along the length of the second ramp member. The sled is shaped and dimensioned for receiving the object thereon and moving the object along the length of the second ramp member. A winch system is mounted proximate the front end of the support frame. The winch system includes a cable for attachment to the sled. The winch system, with the first and second ramp members separated such that only a front end of the second ramp member overlies the rear end of the first ramp member with the first and second ramp members pivoted downwardly to facilitate loading of the object, pulls the sled forward up the second ramp member, the second slide member forward within the first ramp member, and the sled, the second slide member and the first slide member ultimately toward the front end of the support frame.

It is also an object of the present invention to provide a device wherein the sled includes a sled frame and a wheel well shaped and dimensioned for receiving the front wheel of a motorcycle.

It is another object of the present invention to provide a device wherein the wheel well is pivotally coupled to the sled frame for movement between a pivot loading position and a retained position.

It is a further object of the present invention to provide a device wherein the sled further includes means for selectively locking the wheel well in the retained position.

It is also an object of the present invention to provide a device wherein the sled further includes retaining straps for securing the front wheel of a motorcycle within the wheel well.

It is another object of the present invention to provide a device wherein the support frame is shaped and dimensioned to be received within a vehicle to permit transport of the object.

It is a further object of the present invention to provide a device wherein the vehicle is a pick-up truck.

It is also an object of the present invention to provide a device wherein the second ramp member includes a wheel support for supporting the rear wheel of a motorcycle.

It is another object of the present invention to provide a device wherein the first ramp member includes a channel and the second ramp member includes a guide means secured within the channel.

It is a further object of the present invention to provide a device wherein the guide means includes a pair of spaced wheels.

Other objects and advantages of the present invention will become apparent from the following detailed description when viewed in conjunction with the accompanying drawings, which set forth certain embodiments of the invention.

DESCRIPTION OF THE PREFERRED EMBODIMENT

Figure 1:
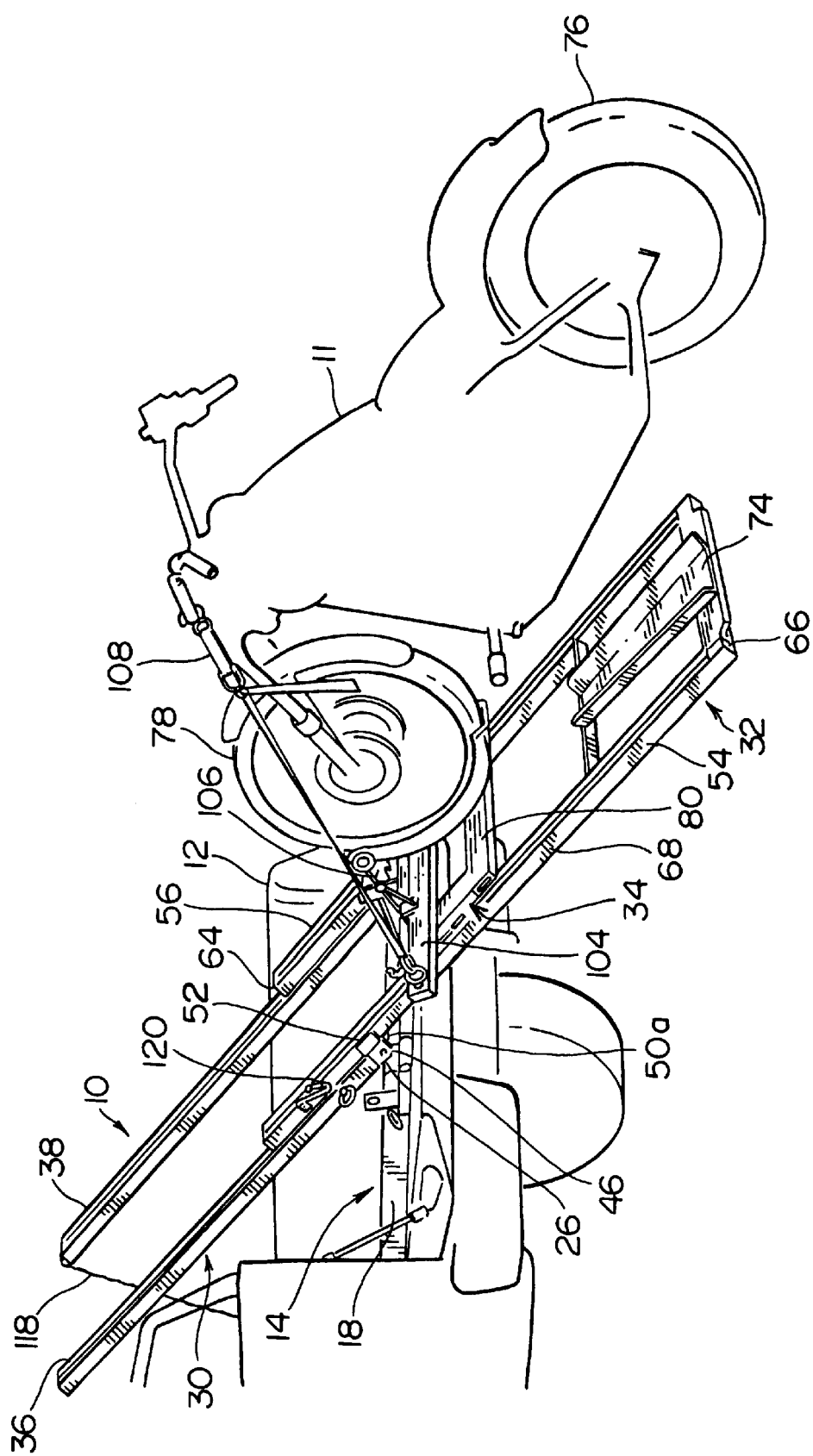
FIG. 1 is a perspective view of the present invention with the motorcycle partially loaded on the truck.
Figure 2:
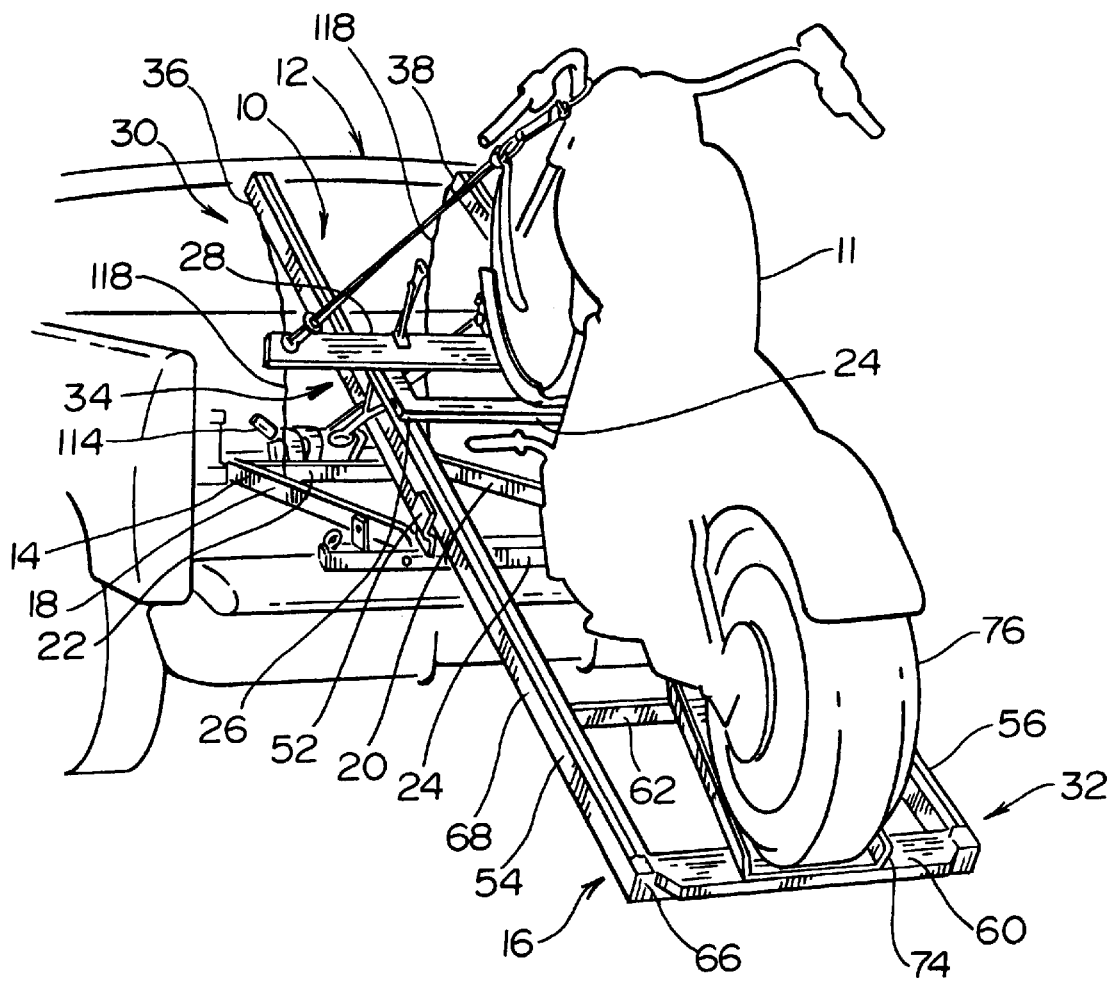
FIG. 2 is a rear perspective view of the present invention with the motorcycle partially loaded on the truck.

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIGS. 1 through 8, the preferred embodiment of the present lift and transport apparatus 10 for a motorcycle 11 is disclosed. The apparatus 10 includes a support frame 14 and a ramp assembly 16. The support frame 14 and ramp assembly 16 may be made from various materials such as steel, metal alloys or other materials used in the construction of heavy duty equipment.

The support frame 14 is generally rectangular and dimensioned to fit within the bed of a pick-up truck 12. The support frame 14 includes first and second longitudinal support beams 18, 20 connected by cross beams 22, 24 adjacent the rear end 26 of the support frame 14 and the front end 28 of the support frame 14. While the preferred embodiment is disclosed for mounting within a pick-up truck 12, the present apparatus 10 may be varied for use in a variety of locations.

The ramp assembly 16 is pivotally coupled to the rear end 26 of the support frame 14 such that the ramp assembly 16 may be extended from the bed of the pick-up truck 12 without any interference from the pick-up truck. The ramp assembly 16 includes a first ramp member 30 which functions together with a second ramp member 32 and a sled 34 to form the telescoping, pivotal ramp assembly 16.

The first ramp member 30 includes first and second longitudinal support beams 36, 38. The first and second longitudinal beams 36, 38 of the first ramp member 30 respectively include upwardly facing C-shaped channels 48 (see FIG. 5) shaped to receive portions of the second ramp member 32 in a manner that will be discussed in greater detail below.

A pair of hinge assemblies 50a, 50b secure the rear end 46 of the first ramp member 30 to the cross beam 24 positioned at the rear end 26 of the support frame 14. The hinge assemblies 50a, 50b secure the rear end 46 of first ramp member 30 to the rear cross beam 24 creating an extremely durable pivotal connection. Each hinge assembly 50a, 50b includes an upwardly extending side wall 52 which guides the second ramp member 32 along the length of the first ramp member 30 associated therewith. In other words, the side walls 52 of the hinge assemblies 50a, 50b prevent sideward movement of the second ramp member 32 as it slides along the length of the first ramp member 30.

The second ramp member 32 is constructed from first and second longitudinal support beams 54, 56 connected by two cross beams 60, 62 respectively located adjacent the rear end 66 of the second ramp member 32 and a central portion 68 of the second ramp member 32. The second ramp member 32 includes downward projecting wheels 70 which guide the second ramp member 32 relative to the first ramp member 30. The wheels 70, secured to the front end 64 of the second ramp member 32, are received within the C-shaped channels of the first ramp member 30. The wheels 70 allow the second ramp member 32 to freely travel along the length of the first ramp member 30 while remaining connected thereto. The C-shaped channels 48 of the first ramp member 30 include stop members (not shown) therein which limit the movement of the second ramp member 32 relative to the first ramp member 30.

As with the first ramp member 30, the longitudinal beams 54, 56 of the second ramp member 32 respectively include upwardly facing C-shaped channels 72 shaped to receive portions of the sled 34 in a manner that will be discussed in greater detail below. The second ramp member 32 also includes a motorcycle wheel support 74 mounted between the cross beam 60 at the rear end 66 of the second ramp member 32 and the cross beam 62 at the central portion 68 of the second ramp member 32. The wheel support 74 is shaped and dimensioned to support the rear wheel 76 of a motorcycle 11 when it is drawn onto the present apparatus 10.

A sled 34 for receiving the front wheel 78 of the motorcycle 11 is mounted on the upper surface of the second ramp member 32. Specifically, the sled frame 80 is composed of two longitudinal support beams 82 (only one shown) connected by two cross beams 86, 88 positioned adjacent the rear end 90 of the sled 34 and the front end 92 of the sled 34. The sled frame 80 includes downwardly extending wheels 94 received and retained within the C-shaped channels 72 of the second ramp member 32 (see FIG. 6). The wheels 94 allow the sled 34 to freely travel along the length of the second ramp member 32 while remaining coupled thereto. However, the C-shaped channels 72 of the second ramp member 32 are closed at their respective ends to prevent the wheels 94 of the sled 34 from moving beyond the length of the second ramp member 32.

Figure 7:
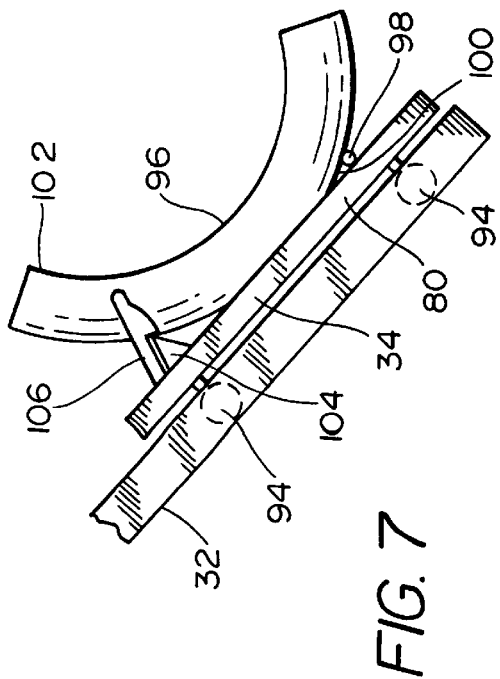
FIG. 7 is a side view of the sled with the wheel well in its retained position.

The sled 34 further includes a wheel well 96. The wheel well 96 is shaped to receive and retain the front wheel 78 of a motorcycle 11 and is pivotally secured to the sled frame 80. Specifically, a hinge 98 pivotally connects a rear portion 100 of the wheel well 96 to the cross beam 88 adjacent the rear end 90 of the sled frame 80. The front portion 102 of the wheel well 96 includes a support bracket 104 laterally secured thereto. The support bracket 104 limits the downward movement of the wheel well 96 as the wheel well 96 moves from its pivoted loading position (see FIG. 8) to its retained position (see FIG. 7). Movement of the wheel well 96 is further controlled by the provision of a pivoting lock member 106 engaging the support bracket 104. The pivoting lock member 106 engages the support bracket 104 as shown in FIG. 7 to prevent movement of the wheel well 96 from the retained position to the pivoted loading position.

In use, pivoting lock member is released and the wheel well 96 is pivoted forward to its loading position to receive the front wheel 78 of the motorcycle 11. Once the front wheel 78 is positioned with the wheel well 96, the motorcycle 11 is pushed forward (using the winch system as discussed below) until the wheel well 96 rotates back to its retained position. At that time, the pivoting lock member 106 engages the support bracket 104 to securely hold the wheel well 96 in the desired position for further loading.

The wheel well 96 is centrally positioned on the sled 34 such that a loaded motorcycle 11 is properly positioned on the present apparatus 10. The sled 34 further includes retaining straps 108 coupled to the support bracket 104. The retaining straps 108 are adjustable straps and are adapted for attachment to the front end of the motorcycle 11 to ensure secure attachment of the front end of the motorcycle 11 to the sled 34. The sled 34 also includes a pulley arrangement 110 designed to guide a winch cable 112, which is secured to the front portion 102 of the wheel well 96, in a manner discussed in greater detail below.

A winch system 114 is mounted to the cross beam 22 located adjacent the front end 28 of the support frame 14. The winch system 114 is preferably powered via the electrical system of the vehicle, although other powering arrangements may be employed without departing from the spirit of the present invention. The winch system 114 includes a winch cable 112 which is coupled to the sled 34 of the ramp assembly 16. The winch cable 112 is guided to the ramp assembly 16 by a pulley 116 located on the cross beam 24 adjacent the rear end 26 of the support frame 14 and the pulley arrangement 110 located on the front end 92 of the sled 34.

Figure 3:
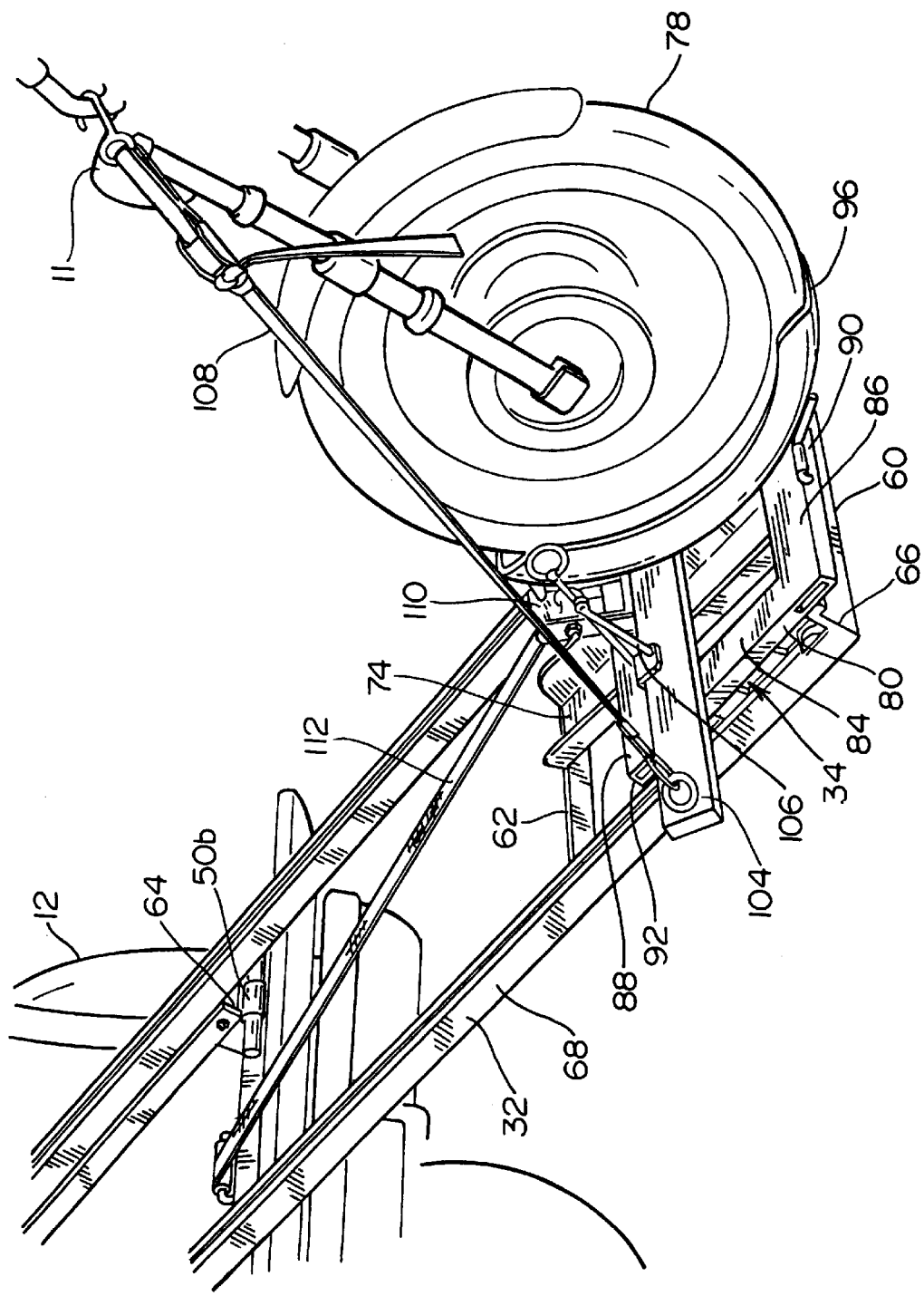
FIG. 3 is a detailed view of the front end of the present invention with the motorcycle loaded in the wheel well.
Figure 4:
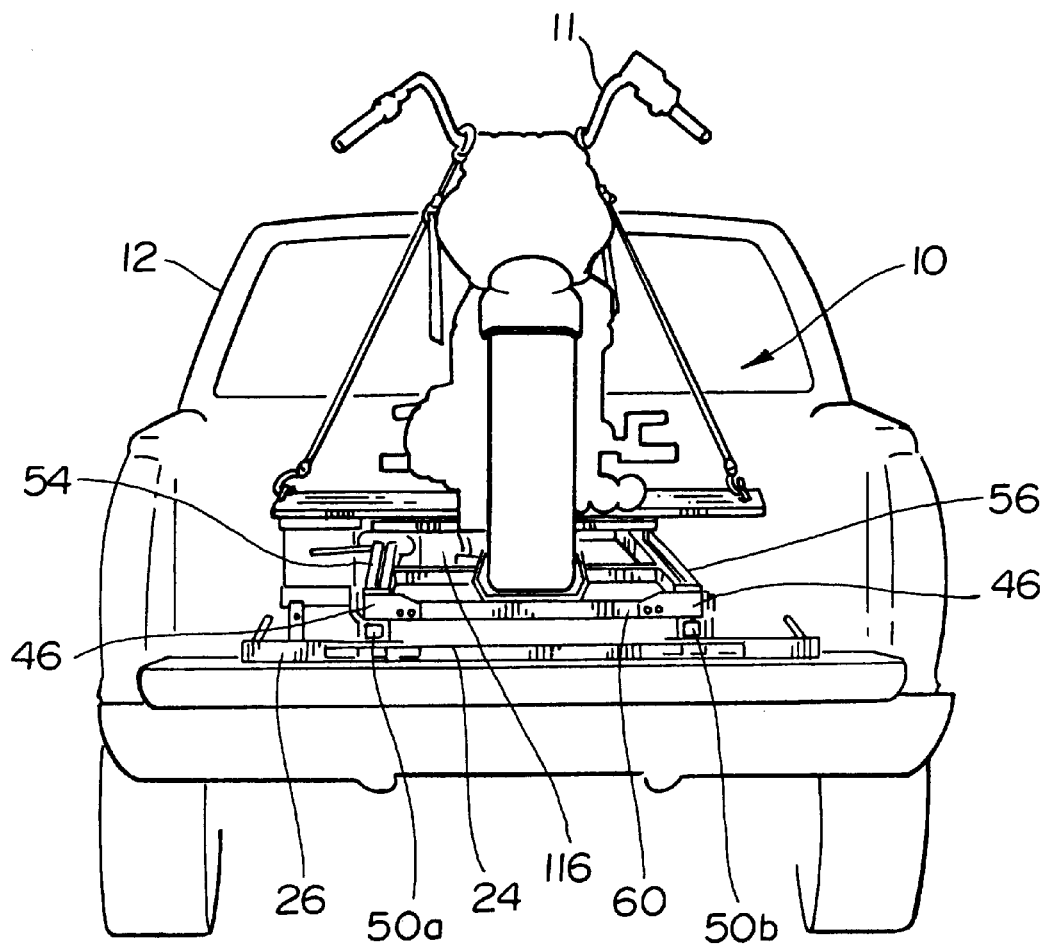
FIG. 4 is a rear view of the present invention with the motorcycle fully loaded on the truck.
Figure 5:
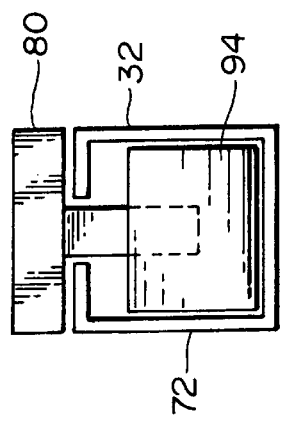
FIG. 5 is a cross sectional view of the first and second ramp members.
Figure 6:
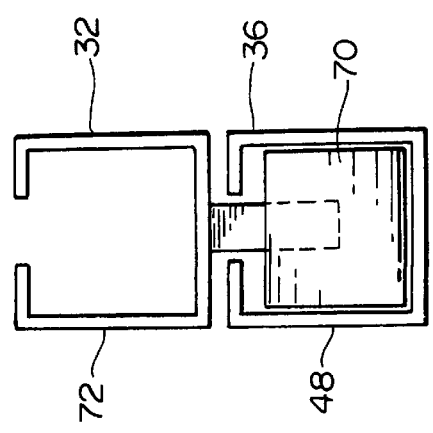
FIG. 6 is a cross sectional view of the second ramp member and the sled.
Figure 8:
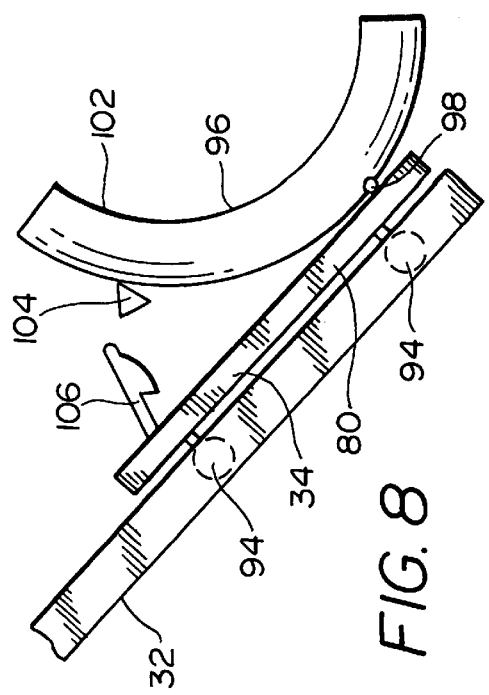
FIG. 8 is a side view of the sled with the wheel well in its pivoted loading position.

In operation, the apparatus 10, once bolted to the bed of a pick-up truck 12, is fully extended as shown in FIG. 1. That is, the first and second ramp members 30, 32 are separated such that only the front end 64 of the second ramp member 32 overlies the rear end 46 of the first ramp member 30 and the two members are pivoted to an angle no greater than 45 degrees from the horizontal surface of the support frame 14. The orientation of the ramp assembly 16 is controlled by cables 118 secured between the front end 44 of the first ramp member 30 and the support frame 14. The sled 34 is also moved to its most rearward position such that it lies adjacent the ground and the rear end 66 of the second ramp member 32 as shown in FIG. 3.

The motorcycle 11 is then moved to the apparatus 10, and the front wheel 78 of the motorcycle 11 is placed within the wheel well 96. As discussed above, the pivoting lock member 106 is released and the wheel well 96 is pivoted forward to its loading position to easily receive the front wheel 78 of the motorcycle 11. Once the front wheel 78 is positioned with the wheel well 96, the front end 78 of the motorcycle 11 is then secured to the sled 34 by the various retaining straps 108 coupled to the sled 34. The motorcycle 11 is pulled forward using the winch system until the wheel well 96 rotates back to its retained position. At that time, the pivoting lock member 106 engages the support bracket 104 to securely hold the wheel well 96 in the desired position for further loading.

Once the front end of the motorcycle 11 is properly secured to the sled 34, the winch system 114 is actuated and begins to pull the motorcycle 11, the sled 34 and second ramp member 32 along the length of the first ramp member 30. Specifically, the winch cable 112 begins pulling the sled 34 up the second ramp member 32. As the motorcycle 11 is pulled up the second ramp member 32, the rear wheel 76 of the motorcycle 11 moves onto the wheel support 74 provided at the rear end 66 of the second ramp member 32.

At this time, the sled 34 should be reaching the front end 64 of the second ramp member 32 where its forward motion is stopped. The second slide member 32 then slides within the first ramp member 30. A greater portion of the weight of the motorcycle 11 will eventually cross a pivot point and will cause the first and second ramp members 30, 32 to automatically pivot until they are parallel with the upper horizontal surface of support frame 14. The motorcycle 11 is pulled toward the front of the support frame 14 until the second ramp member 32 reaches the front ends 28, 44 of the first ramp member 30 and the support frame 14.

The apparatus may then be locked in position by a safety lock 120 secured to the second ramp member 32. The safety lock engages the sled 34 and prevents relative movement between the second ramp member 32 and the sled 34. The apparatus 10 may further be provided with straps for attachment to the rear end of the motorcycle 11.

The motorcycle 11 may be removed from the apparatus 10 by simply reversing the loading process. Specifically, the winch system 114 is reversed and the second ramp member 32 is manually pulled rearwardly. Once the second ramp member 32 reaches a point where the majority of the weight crosses the pivot point, the ramp assembly 16 will begin to move downwardly on its own. At the time when the first and second ramp members 30, 32 are fully extended, the safety lock 120 is released and the sled 34 is permitted to move downwardly under the control of the winch system 114. When the sled 34 reaches its most rearward position, the pivoting lock member 106 is released, the wheel well 96 rotates for unloading and the retaining straps 108 are removed.

While the disclosed embodiment includes a ramp assembly designed to accommodate a single motorcycle, the ramp assembly may be varied to accommodate additional motorcycles without departing from the spirit of the present invention. For example, the ramp assembly could be provided with a pair of first ramp members cooperating with a pair of second ramp members to form a rigid ramp assembly designed to accommodate two motorcycles.

While various preferred embodiments have been shown and described, it will be understood that there is no intent to limit the invention by such disclosure, but rather, is intended to cover all modifications and alternate constructions falling within the spirit and scope of the invention.

What is claimed is:

1. A device for loading and unloading an object, comprising:

a support frame including a front end and a rear end;

a ramp including a first ramp member having a rear end pivotally attached to the support frame and extending forward toward the front end of the support frame and a second ramp member telescopically secured to the first ramp member permitting the second ramp member to travel the length of the first ramp member and to pivot therewith;

a sled mounted to the second ramp member for free movement along the length of the second ramp member, the sled being shaped and dimensioned for receiving the object thereon and moving the object along the length of the second ramp member; and a winch system mounted proximate the front end of the support frame, the winch system including a cable for attachment to the sled;

wherein the winch system, with the first and second ramp members separated such that only a front end of the second ramp member overlies the rear end of the first ramp member with the first and second ramp members pivoted to facilitate loading of a motorcycle, pulls the sled forward up the second ramp member, the second ramp member forward within the first ramp member, and the sled, the second ramp member and the first ramp member ultimately toward the front end of the support frame.

2. The device according to claim 1, wherein the sled includes a sled frame and a wheel well shaped and dimensioned for receiving the front wheel of a motorcycle.

3. The device according to claim 2, wherein the wheel well is pivotally coupled to the sled frame for movement between a pivot loading position and a retained position.

4. The device according to claim 3, wherein the sled further includes means for selectively locking the wheel well in the retained position.

5. The device according to claim 2, wherein the sled further includes retaining straps for securing the front wheel of a motorcycle within the wheel well.

6. The device according to claim 1, wherein the support frame is shaped and dimensioned to be received within a vehicle to permit transport of an object.

7. The device according to claim 6, wherein the vehicle is a pick-up truck.

8. The device according to claim 1, wherein the second ramp member includes a wheel support for supporting the rear wheel of a motorcycle.

9. The device according to claim 1, wherein the first ramp member includes a channel and the second ramp member includes a guide means secured within the channel.

10. The device according to claim 9, wherein the guide means includes a pair of spaced wheels.

11. A vehicle adapted for retrieving and transporting an object, wherein the vehicle includes a device for loading and unloading objects which comprises:

a support frame including a front end and a rear end;

a ramp including a first ramp member having a rear end pivotally attached to the support frame and extending forward toward the front end of the support frame and a second ramp member telescopically secured to the first ramp member permitting the second ramp member to travel the length of the first ramp member and to pivot therewith;

a sled mounted to the second ramp member for free movement along the length of the second ramp member, the sled being shaped and dimensioned for receiving the object thereon and moving the object along the length of the second ramp member; and a winch system mounted proximate the front end of the support frame, the winch system including a cable for attachment to the sled;

wherein the winch system, with the first and second ramp members separated such that only a front end of the second ramp member overlies the rear end of the first ramp member with the first and second ramp members pivoted to facilitate loading of a motorcycle, pulls the sled forward up the second ramp member, the second ramp member forward within the first ramp member, and the sled, the second ramp member and the first ramp member ultimately toward the front end of the support frame.

12. The vehicle according to claim 11, wherein the sled includes a sled frame and a wheel well shaped and dimensioned for receiving the front wheel of a motorcycle.

13. The vehicle according to claim 12, wherein the wheel well is pivotally coupled to the sled frame for movement between a pivot loading position and a retained position.

14. The vehicle according to claim 13, wherein the sled further includes means for selectively locking the wheel well in the retained position.

15. The vehicle according to claim 12, wherein the sled further includes retaining straps for securing the front wheel of a motorcycle within the wheel well.

16. The vehicle according to claim 11, wherein the vehicle is a pick-up truck and the support frame is shaped and dimensioned to be received within the bed of the pick-up truck.

17. The vehicle according to claim 11, wherein the second ramp member includes a wheel support for supporting the rear wheel of a motorcycle.

18. The vehicle according to claim 11, wherein the first ramp member includes a channel and the second ramp member includes a guide means secured within the channel.

19. The vehicle according to claim 18, wherein the guide means includes a pair of spaced wheels.

* * * * *